(12) United States Patent
Meernik et al.

(10) Patent No.: US 6,976,565 B2
(45) Date of Patent: Dec. 20, 2005

(54) LOAD CARRYING AXIAL POSITIONERS WITH OVERLOAD ENERGY ABSORPTION

(75) Inventors: Paul R. Meernik, Redford, MI (US); Joseph D. Mc Cleary, Clinton Township, Macomb County, MI (US); Kenneth J. Baron, Sterling Heights, MI (US); Jenne-Tai Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/775,452

(22) Filed: Feb. 10, 2004

(65) Prior Publication Data

US 2005/0173216 A1    Aug. 11, 2005

(51) Int. Cl.[7] ............... F16F 7/12; F16F 1/00
(52) U.S. Cl. ............ 188/372; 188/375; 267/71
(58) Field of Search ............... 188/371, 372, 188/375, 376, 205 R; 267/69, 70, 71, 73, 267/74; 293/119, 132, 133, 135, 136, 137; 74/492; 248/573, 580, 581, 610, 613

(56) References Cited

U.S. PATENT DOCUMENTS

| | | | | |
|---|---|---|---|---|
| 2,995,327 A | * | 8/1961 | Wood | ............... 267/71 |
| 4,456,233 A | * | 6/1984 | Muller | ............... 267/70 |
| 5,423,400 A | * | 6/1995 | Wesselski | ............... 267/162 |
| 5,967,573 A | | 10/1999 | Wang | ............... 293/119 |
| 6,263,605 B1 | * | 7/2001 | Vanell | ............... 451/443 |
| 6,302,458 B1 | | 10/2001 | Wang et al. | ............... 293/132 |
| 6,401,565 B1 | | 6/2002 | Wang et al. | ............... 74/502.4 |
| 6,641,166 B2 | * | 11/2003 | Browne et al. | ............... 280/752 |
| 6,709,035 B1 | * | 3/2004 | Namuduri et al. | ............... 293/119 |

* cited by examiner

*Primary Examiner*—Thomas Williams
(74) *Attorney, Agent, or Firm*—Kathryn A. Marra

(57) ABSTRACT

An axial positioner capable of yielding to absorb energy under compression or tension loads. The positioner includes an outer tube having first and second ends, a threaded actuator rod extending between the first and second ends and a drive to rotate the actuator rod. A threaded member threadably engaging the actuator rod moves axially between the ends of the outer tube as the actuator rod rotates. The member includes a radial flange extending toward the outer tube. A radially extending load ring spaced axially from the flange is connected to a plurality of axially extending force transmitting elements. A spring positioned between the flange and a load ring expands radially outward against the outer tube when compressed between the flange and the load ring. Loading of the spring against the tube absorbs energy of axial motion of the flange under excessive loads transmitted by the force transmitting elements to the load ring.

20 Claims, 3 Drawing Sheets

US 6,976,565 B2

LOAD CARRYING AXIAL POSITIONERS WITH OVERLOAD ENERGY ABSORPTION

TECHNICAL FIELD

This invention relates to axial positioners capable of functioning under impact as energy absorbers.

BACKGROUND OF THE INVENTION

Self-locking telescoping devices for energy absorption and including axial positioning means are known in the art. A proposed use includes positioning a vehicle bumper for maximum energy absorption prior to impact. However, these devices appear complex and maybe expensive to manufacture.

SUMMARY OF THE INVENTION

The present invention provides simplified axial positioners combined with expanding spring energy absorbers. The positioners are capable of fixing a positioned external object and absorbing energy while maintaining the load limit. Energy absorbers for either compression or tension loads may be included. The external object may be of any type for which positioning and restraint with energy absorption of impact loading is desired. Such objects may include vehicle bumpers, roll bars, knee bolsters, seat belt restraints and others.

An axial positioner according to the invention preferably includes an outer tube with first and second ends. A threaded actuator rod extends between the first and second ends of the outer tube. In an exemplary embodiment, the threaded actuator rod has shearable teeth. A drive connected to one end of the outer tube operates to rotate the actuator rod.

An axially movable self-loading restraint assembly threadably engages the actuator rod. The restraint assembly includes a positioning and load initiating internally threaded member threadably engaging the actuator rod, a radially extending load ring spaced axially from the member, and a radially expandable spring, such as a wave spring or a conic spring, positioned between the threaded member and the load ring.

The threaded member includes a radial flange extending toward the outer tube. The radially extending load ring directly engages the threaded member when moved axially in one direction and indirectly engages the threaded member through the spring positioned between the flange and the load ring when the load ring is moved in an opposite direction. When the load ring engages the spring with sufficient force, the spring becomes compressed. Compression of the spring between the flange and the load ring expands the spring radially outward against the outer tube. The resulting engagement of the spring with the outer tube creates resistance to axial motion, which absorbs energy when the restraint assembly is moved with sufficient force.

Tension or compression loads are transmitted to the load ring through a plurality of axially extending force transmitting elements extending through one end of the outer tube. The force transmitting elements may be connected outside the tube with a movable object that exerts either tension or compression loads on the restraint assembly of the axial positioner through the force transmitting elements.

The axial position of the movable object may be altered by rotating the actuator rod with the drive. Depending upon the direction of rotation, the actuator rod can move the restraint assembly in an extension direction, which extends the force transmitting elements from the outer tube, or a retraction direction, which retracts the force transmitting elements into the outer tube.

In an alternative embodiment, a yieldable stop such as a shear pin acts between the threaded member and the load ring to yieldabley retain the load ring a distance from the spring. Under normal tension or compression loads, the stop prevents the load ring from compressing the spring against the flange to prevent the restraint assembly from engaging the tube. When an excessive compression or tension load is exerted on the restraint assembly, the stop yields to allow the load ring to compress the spring against the flange and absorb energy upon motion of the movable object.

In another alternative embodiment, the threaded member is an assembly including a flange with a threaded insert. The insert threadably engages the actuator rod and is retained within the flange with a shear pin. Under normal tension or compression loads, the shear pin retains the insert within the flange. Under excessive compression or tension loads, the load ring compresses the spring against the flange. As the spring is compressed, the load is transferred through the spring to the flange, which in turn exerts pressure on the shear pin causing it to shear and allow the flange to separate from the insert. This prevents the teeth of the actuator rod from shearing and allows the restraint assembly to move within the outer tube resisted by the expansion and engagement of the spring with the outer tube.

These and other features and advantages of the invention will be more fully understood from the following description of certain specific embodiments of the invention taken together with the accompanying drawings.

DESCRIPTION OF THE PREFERRED EMBODIMENT

Figure 1:
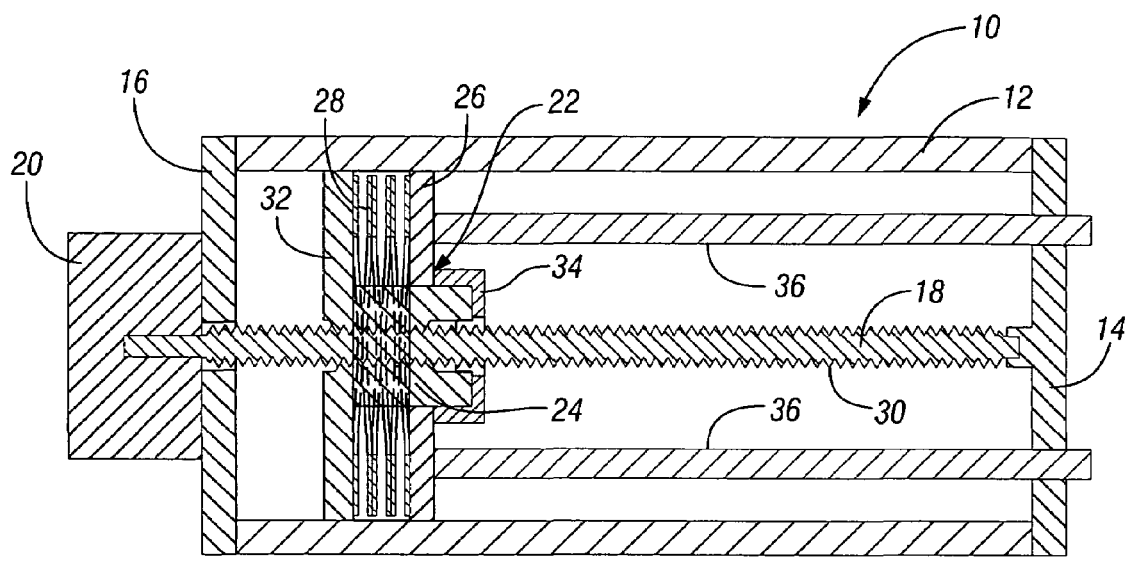
FIG. 1 is a cross-sectional view of an axial positioner for compression loads according to the present invention.
Figure 2:
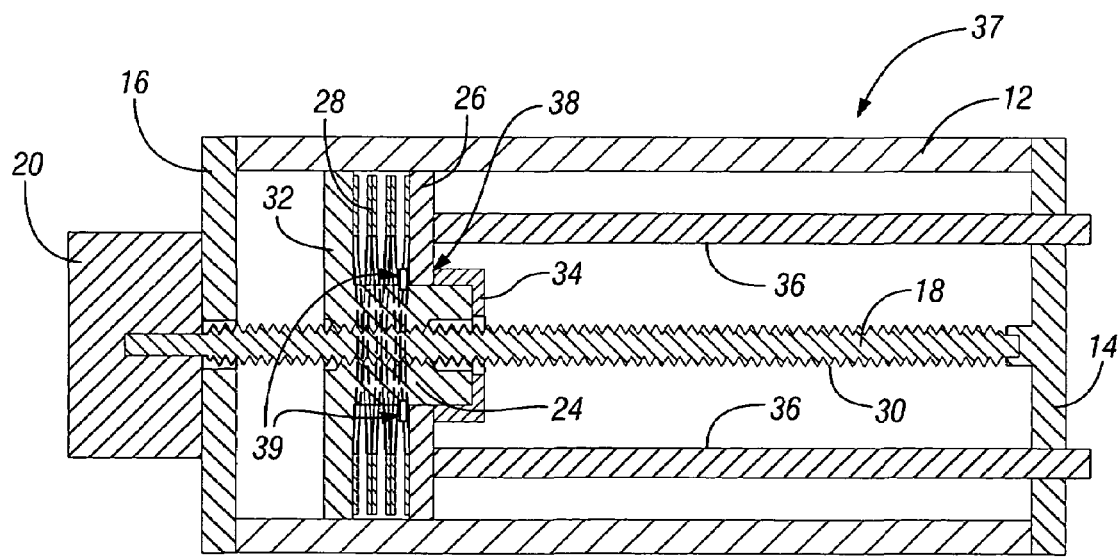
FIG. 2 is a cross-sectional view of an alternative embodiment of the positioner similar to that of FIG. 1.

Referring first to FIGS. 1 and 2 of the drawings in detail, numeral 10 generally indicates an energy absorbing axial positioner designed to yield and absorb energy under excessive compression loads. The positioner 10 includes an outer tube 12 having first and second ends 14, 16. A threaded actuator rod 18 extends between the first and second ends 14, 16. A drive 20 connected to one end of the outer tube 12 is operable to rotate the actuator rod 18 within the outer tube. The drive may be of any suitable type, for example an electric motor with mechanical gearing, not shown.

An axially movable self loading restraint assembly 22 threadably engages the actuator rod. The restraint assembly 22 includes a radially extending positioning and load initiating internally threaded member 24, a radially extending load ring 26 and a radially expandable spring 28 which preferably takes the form of a spring pack.

The threaded member 24 threadably engages teeth 30 of the actuator rod 18 so that, as the rod rotates, it drives the restraint assembly 22, in an axial direction. The threaded member 24 includes a radial flange 32, extending outward toward the outer tube 12, and a retainer cap 34 axially spaced from the flange 32.

The radially extending load ring 26 is retained between the retainer cap 34 and the flange 32. A plurality of force transmitting elements 36 extend axially from the load ring 26 through one end of the outer tube 12.

The radially expandable spring 28 is positioned between the radial flange 32 and the load ring 26. In exemplary embodiments, the spring 28 may be either a wave spring or a conic spring. As the spring 28 is compressed between the load ring 26 and the radial flange 32, the spring expands radially against the outer tube 12, thereby exerting a radial force against the outer tube and holding the positioner 10 in position until an overload force is reached which forces the restraint assembly axially against a restraining force which absorbs energy.

FIG. 2 shows an axial positioner 37 having a restraint assembly 38 that is a variation of the restraint assembly 22 of the axial positioner 10 and wherein like numerals indicate like parts. The restraint assembly 38 includes yieldable stops 39, such as shear pins, extending from the threaded member 24 to hold the load ring 26 away from the spring 28. The yieldable stops 39 are designed to withstand typical positioning loads exerted by rotation of the actuator rod 18. Under excessive compression loads, the stops 39 are designed to yield to allow the load ring 26 to compress the spring 28 against the flange 32 and lock the positioner 37 in place until an overload force is reached and energy absorption takes place upon axial motion of the restraint assembly 22.

Figure 3:
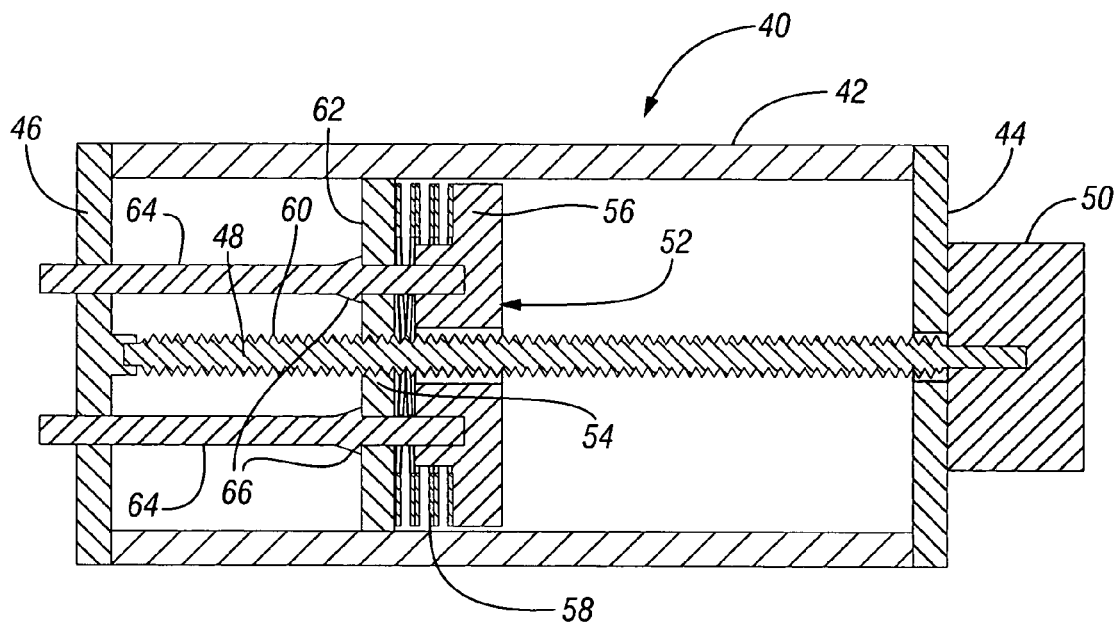
FIG. 3 is a cross-sectional view of an alternative embodiment for tension loads of an axial positioner according to the present invention.

Referring now to FIG. 3, numeral 40 indicates an energy absorbing axial positioner designed to yield and absorb energy under excessive tension loads. The axial positioner 40 includes an outer tube 42 having first and second ends 44, 46. A threaded actuator rod 48 extends between the first and second ends 44, 46. A suitable drive 50, such as a motor, is connected to one end of the outer tube 42 and is operable to rotate the actuator rod 48 within the outer tube. An axially movable self-loading restraint assembly 52 threadably engages the actuator rod 48. The restraint assembly 52 includes a radially extending internally threaded member 54, a radially extending load ring 56 and radially expandable spring 58.

The member 54 threadably engages teeth 60 of the actuator rod 48 so that, as the rod rotates, it drives the member 54 and the restraint assembly 52 in an axial direction between the ends 44, 46. Threaded member 54 has a radial flange 62 extending outward toward the outer tube 42. The radially extending load ring 56 is spaced axially from the member 54 and flange 62. The radially expandable spring 58 is positioned between the radial flange 62 and the load ring 56 to exert a radial force against the outer tube 42 when compressed between the flange and the load ring to hold the restraint assembly 52 in place until an overload force occurs that causes axial motion of the restraint assembly 52 with consequent energy absorption.

The load ring 56 is connected to a plurality of axially extending force transmitting elements 64 which extend through the member 54 and one end of the outer tube 42. The force transmitting elements 64 have abutments 66 axially spaced a distance from the load ring 56 to allow the load ring to axially slide for a distance until the abutments engage the threaded member 54. The abutments 66 of the force transmitting elements 64 form stops that directly engage the member 54 in one direction of motion and the load ring 56 indirectly engages the member 54 through the spring 58 in the other direction of motion.

Figure 4:
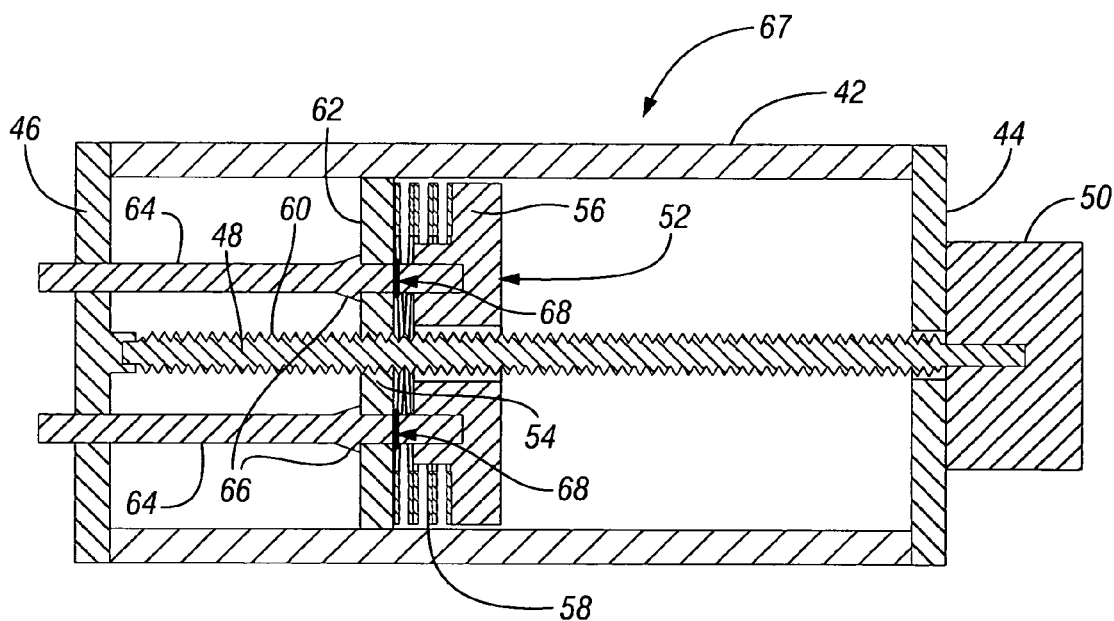
FIG. 4 is a cross-sectional view of an alternative embodiment of the positioner similar to that of FIG. 3.

FIG. 4 shows an axial positioner 67 that is a variation of the axial positioner 40. Positioner 67 includes yieldable stops 68, such as shear pins, acting between the force transmitting elements 64 and the threaded member 54 to hold the load ring 56 away from the spring 58. The stops 68 are designed to withstand typical actuation loads exerted by the rotation of the actuator rod 48. Under excessive tension loads, the stops 68 are designed to yield to allow the load ring 56 to compress the spring 58 against the flange 62 and lock the positioner 67 in place until an overload force is reached.

Figure 5:
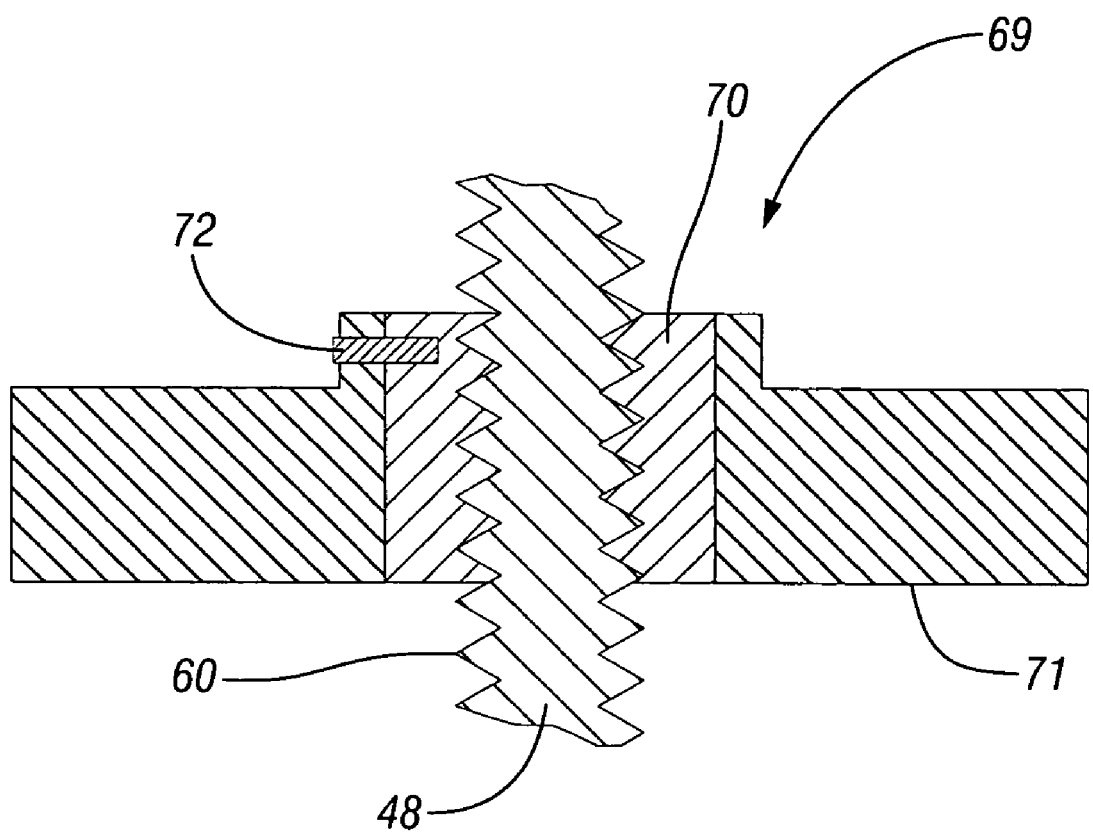
FIG. 5 is an enlarged, cross-sectional view of an alternative form of threaded member having a break away insert.

FIG. 5 shows a threaded member 69 that is a variation of the threaded member 54 used in the axial positioner 67 of FIG. 4, but also applicable in concept to the threaded member 24 of the axial positioner 37 of FIG. 2. The variation includes a threaded insert 70 fitted into a flange 71 of threaded member 69 and engaging the threaded actuator rod 48. The insert 70 threadably engages the teeth 60 of the actuator rod 48 and is retained within the threaded member 69 with a shear pin 72 designed to shear before the teeth 60 of the actuator rod 48. This design allows the flange 71 of member 69 to separate from the insert 70 and the actuator rod 48 under excessive tension loads.

In operation, the axial positioner 10, as illustrated in FIG. 1, may be installed in an automobile for use as a bumper energy absorber or any other desired application where the positioner may be used to absorb compression energy. When installed for use with a bumper, the outer tube 12 would be rigidly attached to the vehicle frame while the force transmitting elements 36 are attached to the bumper.

The length of the positioner 10 may be adjusted by activating the drive 20 to rotate the actuator rod 18, which in turn axially moves the restraint assembly 22. As the assembly 22 moves in an expansion direction, the force transmitting elements 36 are pushed outward from the outer tube 12 to lengthen the positioner 10. Conversely, when the restraint assembly 22 moves in a retraction direction, the force transmitting elements 36 are drawn into the outer tube 12 to shorten the positioner 10.

Under normal compression loads, the teeth 30 of the actuator rod 18 maintain the position of the restraint assembly 22. When an excessive compression load is exerted on the positioner 10, energy is transferred through the force transmitting elements to the load ring 26, causing the load ring to move toward the radial flange 32, thereby compressing the spring 28. As the spring 28 is compressed, it expands radially outward against the outer tube 12 to frictionally load the restraint assembly 22. Under severe compression loads, the outward expansion of the spring 28 may plastically deform the outer tube 12 for a distance as the expanded spring slides within the outer tube.

The force exerted by the spring 28 against the outer tube 12 absorbs energy by converting a portion of the kinetic compression energy into work. Additional kinetic energy may also be absorbed by the positioner 10 by allowing the teeth 30 of the actuator rod 18 to shear sequentially as the member 24 of the restraint assembly 22 is axially driven within the outer tube by the compression load.

The axial positioner 37 illustrated in FIG. 2 operates similarly to positioner 10 as shown in FIG. 1. However, under low compression loads, the stops 39 prevent the load ring 26 from compressing the spring 28 against the flange 32 to prevent the positioner 10 from prematurely locking. The stops 38 are designed to yield under an excessive compression load to allow the load ring 26 to compress the spring 28 against the flange 32 and load the restraint assembly 22.

In operation, the self-locking telescoping positioner 40, as illustrated in FIG. 3, may be installed in an automobile for use as a seat belt energy absorber or any other desired application where the positioner may be used to absorb tension energy. When installed as a seat belt energy absorber, the outer tube 42 could be rigidly attached to the vehicle frame while the energy transmitting elements 64 are attached to a seat belt harness.

The length of the positioner 40 may be adjusted by activating the drive 50 to rotate the actuator rod 48, which in turn axially moves the restraint assembly 52. As the restraint assembly 52 moves in an expansion direction, the force transmitting elements 64 are pushed outward from the outer tube 42 to lengthen the positioner 40. Conversely, when the restraint assembly 52 moves in a retraction direction, the force transmitting elements 64 are drawn into the outer tube 42 to shorten the positioner 40.

Under normal tension loads, the teeth 60 of the actuator rod 48 maintain the position of the restraint assembly 52. When an excessive tension load is exerted on the positioner 40, the force transmitting elements pull the load ring 56 toward the flange 62, causing the spring 58 to be compressed and expanded radially outward against the outer tube 42 to load the positioner 40. Under severe tension loads, the outward expansion of the spring 58 may plastically deform the outer tube 42 for a distance as the expanded spring 58 slides within the outer tube.

The force exerted by the spring 58 against the outer tube 42 absorbs energy by converting a portion of the kinetic tension energy into work. Additional kinetic energy may also be absorbed by the positioner 40 by allowing the teeth 60 of the actuator rod 48 to shear sequentially as the threaded member 54 of the restraint assembly 52 is axially driven within the outer tube by the tension load.

The axial positioner 67 illustrated in FIG. 4 operates similarly to positioner 40 as shown in FIG. 3. However, under low tension loads, the stops 68 prevent the load ring 56 from compressing the spring 58 against the flange 62 to prevent the positioner 40 from prematurely locking. The stops 68 are designed to yield at a predetermined tension load to allow the load ring 56 to compress the spring 68 against the flange 62 and load the positioner 40.

The alternative threaded member 69 of FIG. 5 may be substituted for threaded member 54 of FIG. 3 or 4 or, with modifications for threaded member 24 of FIG. 1 or 2. The axial positioners so modified, operate initially in the same manner as described above. However, when the shear pin 72 breaks under excessive axial load the insert 70 slides within the radial flange 71 of the threaded member 69 to prevent the teeth 60 of the actuator rod 48 from shearing. As a result, the restraining force is generated by the spring 58 and the friction of the insert 70 sliding within the flange 71.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A load carrying axial positioner with overload energy absorption, the positioner comprising:
   an outer tube having first and second ends;
   a threaded actuator rod extending axially between the first and second ends of the outer tube;
   a drive operable to rotate the actuator rod;
   a threaded member threadably mounted on the actuator rod and axially movable between the ends of the outer tube, the threaded member including a radial flange extending toward the outer tube;
   a radially extending load ring axially movable within the tube and spaced axially from the radial flange
   a radially expandable spring positioned axially between the radial flange and the load ring, the spring operative to radially expand when compressed between the flange and the load ring to exert radial force against the outer tube, thereby generating resistance to axial motion of the load ring within the tube;
   the load ring having a plurality of axially extending force transmitting elements extending through one end of the outer tube; and
     the load ring with the force transmitting elements operatively engaging the threaded member for axial motion therewith;
     wherein the load ring and the force transmitting elements directly engage the threaded member in one direction of motion and the load ring and the force transmitting elements indirectly engage the threaded member through the spring in an other direction of motion.

2. A positioner as in claim 1 wherein a yieldable stop acts between the threaded member and the load ring to yieldably prevent the load ring from compressing the spring.

3. A positioner as in claim 2 wherein the yieldable stop is a shear pin.

4. A positioner as in claim 2 wherein the load ring is operative to exert a load on the stop.

5. A positioner as in claim 4 wherein the stop yields at a predetermined load of the load ring to allow the load ring to compress the spring.

6. A positioner as in claim 1 wherein a yieldable stop acts between the threaded member and the force transmitting elements to yieldably prevent the load ring from compressing the spring.

7. A positioner as in claim 6 wherein the yieldable stop is a shear pin.

8. A positioner as in claim 6 wherein the load ring is operative to exert a load on the yieldable stop.

9. A positioner as in claim 6 wherein the stop yields at a predetermined load of the load ring to allow the load ring to compress the spring.

10. A positioner as in claim 6 wherein abutments extending from the force transmitting elements directly engage the threaded member in one direction of motion and the yieldable stops engage the threaded member in an other direction of motion.

11. A positioner as in claim 1 wherein the threaded actuator rod has teeth which shear under a predetermined load.

12. A positioner as in claim 2 wherein the yieldable stop is designed to shear before teeth of the threaded actuator rod.

13. A positioner as in claim 1 wherein the threaded member includes a threaded insert within the flange and engaging the actuator rod and at least one shear pin retaining the insert within the member.

14. A positioner as in claim 13 wherein the shear pin is designed to shear before teeth of the actuator rod.

15. A positioner as in claim 13 wherein the shearing of the pin separates the insert from the flange allowing the flange to move between the ends of the outer tube.

16. A positioner as in claim 1 wherein the spring is a wave spring.

17. A positioner as in claim 1 wherein the spring is a conic spring.

18. A positioner as in claim 1 wherein the drive is electromechanical.

19. A positioner as in claim 1 wherein the spring is radially expanded by compression loads acting on the force transmitting elements.

20. A positioner as in claim 1 wherein the spring is radially expanded by tension loads acting on the force transmitting elements.

* * * * *